United States Patent
Udagawa

Patent Number: 5,895,055
Date of Patent: Apr. 20, 1999

[54] METAL GASKET WITH OPPOSITE FLANGES

[75] Inventor: Tsunekazu Udagawa, Ichikawa, Japan

[73] Assignee: Ishikawa Gasket Co., Ltd., Tokyo, Japan

[21] Appl. No.: 08/909,688

[22] Filed: Aug. 12, 1997

[51] Int. Cl.$^6$ ............................................. F02F 11/00
[52] U.S. Cl. ........................................ 277/595; 277/594
[58] Field of Search ................................. 277/591, 593, 277/594, 595

[56] References Cited

U.S. PATENT DOCUMENTS

| | | | |
|---|---|---|---|
| 1,589,040 | 6/1926 | Bailey | 277/591 X |
| 3,567,234 | 3/1971 | Skrycki | 277/595 |
| 4,815,750 | 3/1989 | Yoshino | 277/595 |
| 5,094,468 | 3/1992 | Hieble | 277/591 |
| 5,280,928 | 1/1994 | Kosaku et al. | 277/595 |

*Primary Examiner*—Eric K. Nicholson
*Assistant Examiner*—Gary Grafel
*Attorney, Agent, or Firm*—Kanesaka & Takeuchi

[57] ABSTRACT

A metal gasket used for an internal combustion engine is basically formed of a metal plate. The gasket includes at least two openings with a narrow intermediate area therebetween, edge portions situated around the openings, curved portions extending from the edge portions to define the openings, the curved portions situated adjacent to each other extending in the directions opposite to each other, and flange or turning portions extending from the curved portions and located over the edge portions. A stepped portion is located between the edge portions situated adjacent to each other. Therefore, when the gasket is tightened, the stepped portion is compressed to provide a surface pressure thereat to seal the narrow intermediate area.

8 Claims, 1 Drawing Sheet

5,895,055

METAL GASKET WITH OPPOSITE FLANGES

BACKGROUND OF THE INVENTION AND RELATED ART STATEMENT

The present invention relates to a metal gasket with flanges around holes for providing resilient surface pressure at a narrow intermediate area between the holes.

In a metal gasket or a metal laminate gasket, a plurality of holes, such as cylinder bores and fluid holes, is formed. In order to securely seal around the holes, beads and/or flanges (turned portion) are formed around the holes. The bead means a projection extending outwardly from a metal plate or a stepped portion to provide a surface pressure thereat. On the other hand, the flange means a turned or overlapped portion around a hole. When the gasket is situated between a cylinder head and a cylinder block, the beads and/or flanges are compressed to securely seal around the holes.

In case the flanges or turning portions are formed around the holes, the flanges are located on the same side of the metal plate. When the gasket is tightened between the cylinder head and the cylinder block, the flanges around the holes are compressed to provide high surface pressure. However, since the flange does not provide resiliency by itself, surface pressure formed by resiliency can not be formed. Also, equal surface pressure may not be formed throughout the entire area of the flange.

On the other hand, in case the bead is formed around the hole, when the gasket is tightened between the cylinder head and the cylinder block, the bead is compressed to provide surface pressure thereat. In this case, if the surface pressure of the bead is strong, the cylinder bore may deform to cause a serious problem for the engine.

Therefore, there have been proposed gaskets having a flange and a bead to obviate the deformation problem, wherein the bead is formed outside the flange. The combination of the flange and bead can avoid the deformation problem, but in case the distance between the bores is not sufficient, it is not possible to provide the flange and the bead around a bore.

In view of the foregoing, the present invention has been made, and an object of the invention is to provide a metal gasket wherein a surface pressure for sealing is formed at a narrow portion between bores.

Another object of the invention is to provide a metal gasket as stated above, wherein even if a gap exists in sealing portions around the bores, the gasket can securely seal around the bores.

A further object of the invention is to provide a metal gasket as stated above, wherein the gasket can be made thin and simple.

Further objects and advantages of the invention will be apparent from the following description of the invention.

SUMMARY OF THE INVENTION

A metal gasket of the invention is used for an internal combustion engine having at least two holes situated adjacent to each other. Especially, the gasket is suitable for a cylinder head gasket.

The gasket is basically formed of a first metal plate having a base portion extending substantially throughout an entire area of the engine to constitute a metal gasket and at least two openings corresponding to the two holes of the engine. The gasket includes edge portions formed in the first metal plate and situated around the openings, curved portions extending from the edge portions to define the openings, and flange or turning portions extending from the curved portions and located over the edge portions. The curved portions situated adjacent to each other extend in the directions opposite to each other. Therefore, the flanges situated adjacent to each other are located at different sides relative to the base portion.

In the gasket of the invention, a first stepped portion is located between the edge portions situated adjacent to each other. Namely, at least the first stepped portion is formed between the bores, e.g. cylinder bores. Since the ends of the first stepped portion are compressed when the gasket is compressed, the surface pressure is formed at the ends of the first stepped portion, which can provide a resilient surface pressure to securely seal between the bores.

Preferably, the first stepped portion is arranged such that the outer surfaces of the flanges and the edge portions situated adjacent to each other are located in the same planes, respectively. The gasket may further include second stepped portions extending from the first stepped portion and surrounding the respective openings. In this case, the base portion is located in a middle between the edge portion and the flange portion laminated together.

The above gasket is especially useful for an engine having cylinder liners. In the engine with the cylinder liners, there may be deviations in the distances between the cylinder head and the cylinder liner. In this case, the flanges are disposed on the respective cylinder liners, and the first stepped portion is located between the two adjacent cylinder liners. Therefore, even if there is a deviation at the cylinder liners, the first stepped portion can deform and absorb the deviation easily.

The metal gasket of the invention may further include at least one second metal plate laminated on the first metal plate. The second metal plate may have beads surrounding the respective openings and extending toward the first metal plate. The beads are located on the first and second stepped portions to provide surface pressures thereat. Each bead may include a first bead portion located on the first stepped portion, and a second bead portion located on the second stepped portion. The first bead portion is common and branches off to the second bead portions

DETAILED DESCRIPTION OF PREFERRED EMBODIMENTS

Figure 1:
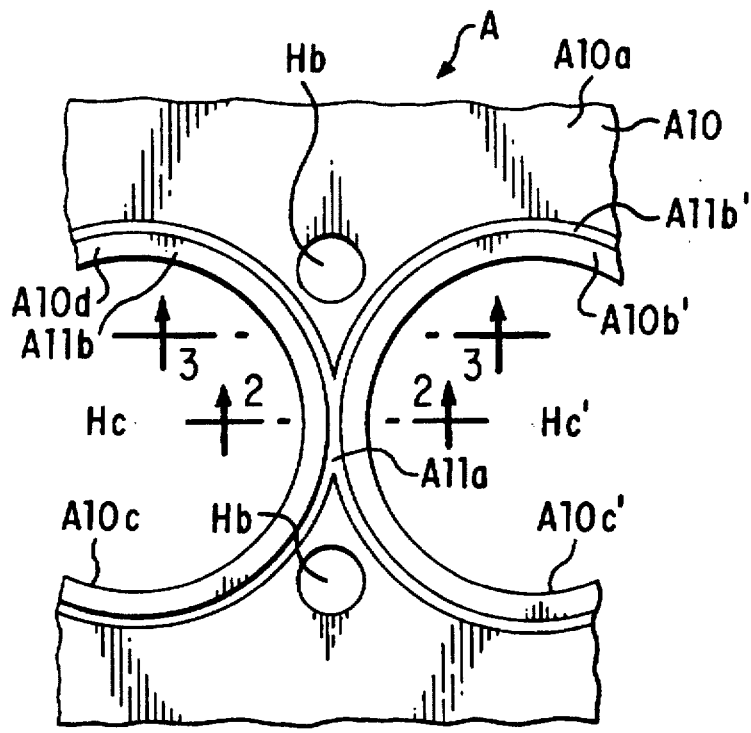
FIG. 1 is a plan view of a part of a first embodiment of a cylinder head gasket of the invention.
Figure 2:
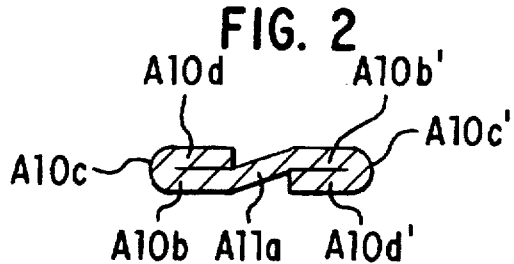
FIG. 2 is an enlarged sectional view taken along line 2—2 in FIG. 1.
Figure 3:
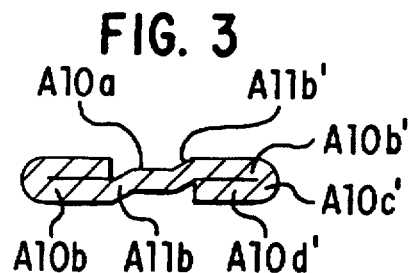
FIG. 3 is an enlarged sectional view taken along line 3—3 in FIG. 1.

FIGS. 1-3 show a first embodiment A of a metal gasket of the invention. The gasket A is a cylinder head gasket and includes a plurality of cylinder bores Hc, Hc', water holes (not shown), bolt holes Hb, and so on, as in the conventional gasket. Since the invention is directed to the structure around he cylinder bores Hc, Hc', especially to the area between the cylinder bores, the rest of the structure of the gasket is not explained. Any structure may be employed for the parts not explained in the invention.

The gasket A is formed of a single metal plate A10 extending substantially throughout an entire area of an engine to be sealed. The gasket A includes a base portion A10a, edge portions A10b, A10b' situated around the cylinder bores Hc, Hc', curved portions A10c, A10c' to define the cylinder bores Hc, Hc', and flanges or turning portions A10d, A10d' laminated over the edge portions A10b, A10b'.

In the gasket A, the flange A10d is located above the edge portion A10b, while the flange A10d' situated near the flange A10d is located under the edge portion A10b'. Namely, the turning directions of the curved portions A10c, A10c' situated adjacent to each other are different or opposite. Therefore, at an intermediate area between the cylinder bores Hc, Hc', a step portion A11a is formed between the two edge portions A10b, A10b'. As a result, the outer surface of the flange A10d is located in the same plane as that of the edge portion A10b situated adjacent thereto. Similarly, the outer surface of the edge A10b is located in the same plane as that of the flange A10d', The plane extending through the surfaces of the flange A10d and the edge portion A10b,' is parallel to the plane extending through the surfaces of the edge portion A10b and the flange A10d'.

In the gasket A, the base portion A10a is located in the middle between the flange A10d and the edge portion A10b, and between the flange A10d' and the edge portion A10b'. Therefore, step portions A11b, A11b' extend from the step portion A11a located at the intermediate area to surround the respective cylinder bores Hc, Hc'. The height of the step portions A11b, A11b' is half of the step portion A11a in case the thickness of the plate A10 is not considered.

When the gasket A thus formed is situated between a cylinder head and a cylinder block (both not shown) and is tightened, the edge portions A10b, A10b' and the flanges A10d, A10d' are compressed At this time, a resilient surface pressure is formed at the edges, i.e. upper and lower ends of the stepped portion A11a, to thereby securely seal at the intermediate area between the cylinder bores Hc, Hc'.

In the gasket A, although the intermediate area between the cylinder bores Hc, Hc' is narrow, the resilient surface pressure is formed thereat. Therefore, it is possible to securely seal between the cylinder bores Hc, Hc'.

Figure 4A:
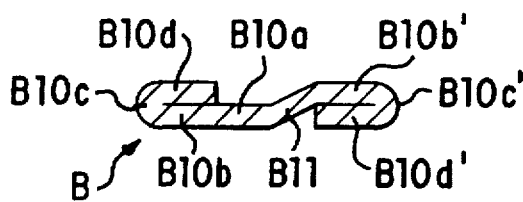
FIG. 4(a) is an enlarged sectional view, similar to FIG. 3, for showing a second embodiment of a cylinder head gasket of the invention.

FIG. 4(a) shows a second embodiment B of the metal gasket of the invention. The gasket B includes a base portion B10a, edge portions B10b, B10b', curved portions B10c, B10c', flanges B10d, B10d', and stepped portion B11, similar to the gasket A. However, in the gasket B, the stepped portion B11 completely surround the cylinder bore Hc', and no stepped portion is formed around the cylinder bore Hc. In the gasket B, since a part of the stepped portion B11 is located at the intermediate area between the cylinder bores Hc, Hc', when the gasket B is compressed, a resilient surface pressure is formed at the intermediate area to thereby securely seal between the cylinder bores Hc, Hc'. Although no resilient surface pressure is formed around the cylinder bore Hc, the gasket B can operate properly as the cylinder head gasket.

Figure 4B:
FIG. 4(b) is a modified example of the second embodiment.
Figure 6:
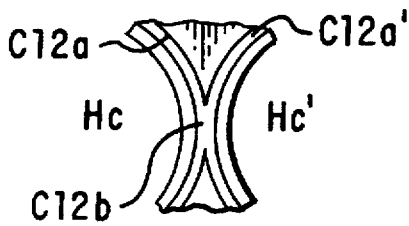
FIG. 6 is an explanatory plan view of the third embodiment of the invention.

FIG. 4(b) shows a modified embodiment B' of the metal gasket B. In the gasket B, the stepped portion B11 is inclined obliquely, but in the gasket B', a stepped portion B11' orients vertically. The rest of the structure of the gasket B' is the same as the gasket B. In the gasket B', a high surface pressure is obtained at the stepped portion when the gasket is tightened.

In case the vertical stepped portion as shown in FIG. 4(b) is formed in the gasket A, both lateral end portions of the stepped portion at the intermediate area may be gradually inclined to continue to the stepped portions A11b, A11b'. In this case, the intermediate area can receive a high surface pressure when the gasket is compressed.

Figure 5:
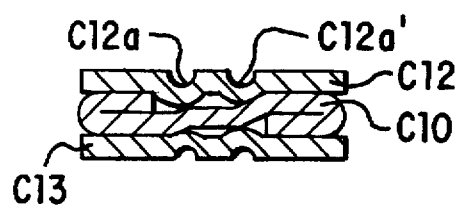
FIG. 5 is an enlarged sectional view, similar to FIG. 3, for a third embodiment of a cylinder head gasket of the invention.

FIG. 5 shows a third embodiment C of the metal gasket of the invention. The gasket C is a metal laminate gasket formed of the metal plate C10, which is the same as the metal plate A10 explained as the gasket A, and upper and lower metal plates C12, C13 disposed above and under the metal plate C10. The upper and lower plates C12, C13 are the same and arranged symmetrically relative to the plate C10.

The upper plate C12 is a flat plate, and includes holes corresponding to those disclosed in the plate A10, and beads C12a, C12a' around the cylinder bores Hc, Hc'. The beads C12a, C12a' are located above the stepped portions A11b, A11b', and are common at a common portion C12b located at the intermediate area between the cylinder bores Hc, Hc'. Namely, the beads C12a, C12a', C12b extend along the stepped portions A11a, A11b, A11b'. Since the lower plate C13 is the same as the upper plate C12, explanation thereof is omitted.

When the gasket C is tightened between the cylinder head and the cylinder block, the stepped portions and the beads are compressed to provide surface pressures thereat. Therefore, the gasket C can securely seal between the cylinder head and the cylinder block.

In the embodiments of the invention, the flanges or turning portions are flat and are closely disposed on the edge portions. However, the flanges may be curved outwardly without closely abutting against edge portions.

In the gasket of the invention, although the distance between the cylinder bores is narrow, the stepped portion is formed between the cylinder bores. Since the stepped portion can provide high surface pressure, the intermediate area between the cylinder bores can be securely sealed.

While the invention has been explained with reference to the specific embodiments of the invention, the explanation is illustrative, and the invention is limited only by the appended claims.

What is claimed is:

1. A metal gasket for an internal combustion engine having at least two holes situated adjacent to each other, comprising:

a first metal plate having a base portion extending substantially throughout an entire area of the engine to constitute a metal gasket and at least two openings corresponding to said at least two holes of the engine, edge portions formed in the first metal plate and situated around the at least two openings, curved portions extending from the edge portions to define the at least two openings, said curved portions situated adjacent to each other extending in directions opposite to each other, flange portions extending from the curved portions and located over the edge portions at opposite sides of the first metal plate, and a first stepped portion located between the edge portions situated adjacent to each other, said first stepped portion forming a surface pressure thereat when the gasket is compressed.

2. A metal gasket according to claim 1, further comprising second stepped portions extending from the first stepped portion and surrounding the respective openings.

3. A metal gasket according to claim 2, wherein said base portion is located in the middle between the edge portion and the flange portion laminated together.

4. A metal gasket according to claim 3, further comprising a second metal plate laminated on the first metal plate and having beads surrounding the respective openings and extending toward the first metal plate, said beads abutting against the first and second stepped portions.

5. A metal gasket according to claim 4, wherein each bead includes a first bead portion located on the first stepped portion, and a second bead portion located on the second stepped portion, said first bead portions situated adjacent to each other being common and branching to the second bead portions.

6. A meal gasket according to claim 1, further comprising at least one second stepped portion extending from the first stepped portion and surrounding at least one of the openings.

7. A metal gasket according to claim 1, wherein the first stepped portion located between the edge portions is arranged such that outer surfaces of the flange portions and the edge portions situated adjacent to each other are located in same planes, respectively, to thereby provide surface pressure at the first stepped portion when the gasket is compressed.

8. A metal gasket according to claim 7, wherein said first stepped portion is inclined relative to the edge portions.

* * * * *

UNITED STATES PATENT AND TRADEMARK OFFICE
CERTIFICATE OF CORRECTION

PATENT NO. : 5,895,055
DATED : April 20, 1999
INVENTOR(S) : Tsunekazu Udagawa

It is certified that error appears in the above-indentified patent and that said Letters Patent is hereby corrected as shown below:

On the title page, [57] ABSTRACT section, line 8, change "turning" to --turned--;

In column 1, line 20, change "turning" to --turned--;

In column 2, line 2, change "turning" to --turned--;

In column 3, line 4, change "he" to --the--;
line 13, change "turning" to --turned--;
line 24, change "edge portion A10b situated" to --edge portion A10b' situated--;
line 42, after "compressed" add period;
line 55, change "surround" to --surrounds--; and In column 4, line 36, change "turning" to --turned--.

Signed and Sealed this

Twenty-eighth Day of September, 1999

Attest:

Q. TODD DICKINSON

*Attesting Officer*      *Acting Commissioner of Patents and Trademarks*